United States Patent [19]

Fisher

[11] 4,398,436
[45] Aug. 16, 1983

[54] MULTIPLE RATIO TRANSMISSION HAVING A TORQUE SPLITTER INPUT GEAR WITH A POCKETED CARRIER

[75] Inventor: Alan R. Fisher, Dearborn, Mich.

[73] Assignee: Ford Motor Company, Dearborn, Mich.

[21] Appl. No.: 137,348

[22] Filed: Apr. 7, 1980

[51] Int. Cl.³ ........................ F16H 47/08; F16H 3/44
[52] U.S. Cl. ........................ 74/688; 74/411; 74/785; 74/720
[58] Field of Search ................ 74/758, 759, 760, 761, 74/688, 681, 411, 694, 695, 720, 785, 788, 789, 792

[56] References Cited

U.S. PATENT DOCUMENTS

| 476,101 | 5/1892 | Thomson | 74/801 |
|---|---|---|---|
| 1,417,797 | 5/1922 | Cook et al. | 74/801 |
| 1,435,821 | 11/1922 | Dorsey | 74/801 |
| 1,819,606 | 8/1931 | Jones | 74/789 |
| 2,178,613 | 11/1939 | Seeck | 74/711 |
| 2,270,581 | 1/1942 | Clarke | 74/792 |
| 2,791,919 | 5/1957 | Wildhaber | 74/714 |
| 2,834,229 | 5/1958 | Graybill | 74/785 X |
| 2,978,929 | 4/1961 | Roberts | 74/711 |
| 3,292,456 | 12/1966 | Saari | 74/711 |
| 3,406,593 | 10/1968 | Vesey | 74/711 |
| 3,706,239 | 12/1972 | Myers | 74/711 X |
| 4,014,223 | 3/1977 | Pierce, Jr. | 74/688 |
| 4,082,475 | 4/1978 | Kuder | 74/801 X |

FOREIGN PATENT DOCUMENTS 835497 12/1938 France .................... 74/785

Primary Examiner—Leslie A. Braun
Assistant Examiner—Lawrence J. Gotts
Attorney, Agent, or Firm—Donald J. Harrington; Keith L. Zerschling

[57] ABSTRACT

A hydrokinetic transmission mechanism for an automotive vehicle driveline including a hydrokinetic torque converter and multiple ratio planetary gearing in combination with a torque splitter gear unit located within the converter housing, the multiple ratio gearing having two separate torque input shafts and the splitter unit being adapted to distribute torque to each of the input shafts, one torque delivery path being fully mechanical and the other being hydrokinetic, the torque splitter unit including a simple planetary gear unit with a pocketed carrier, the planetary gear elements of the torque splitter gear unit being journalled on their peripheries in the carrier thus eliminating the need for a separate torque splitter pinion shafts and bearings.

4 Claims, 7 Drawing Figures

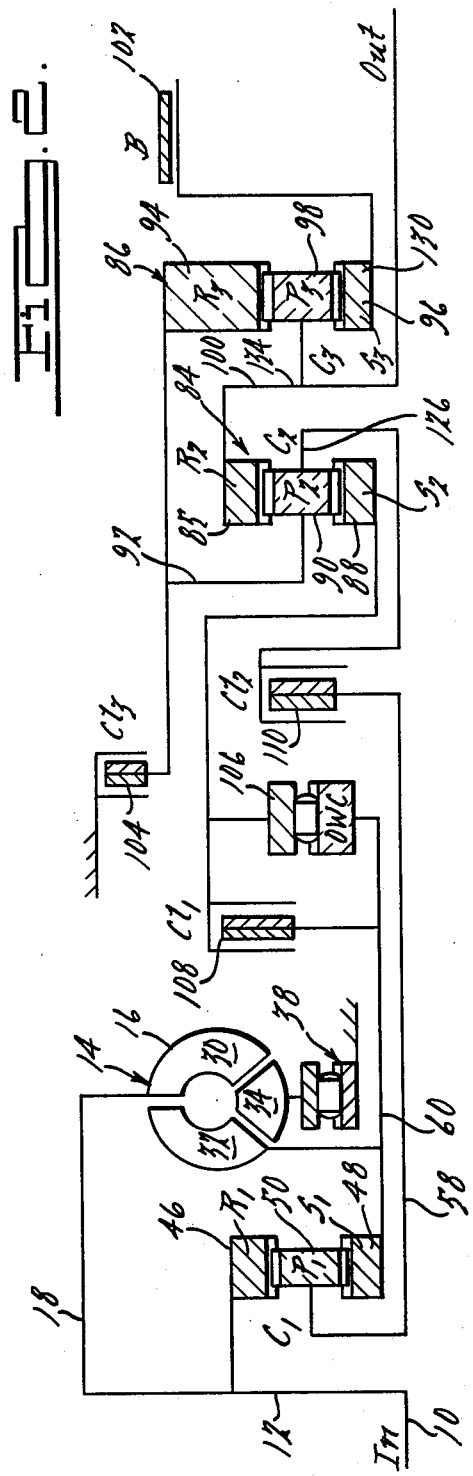

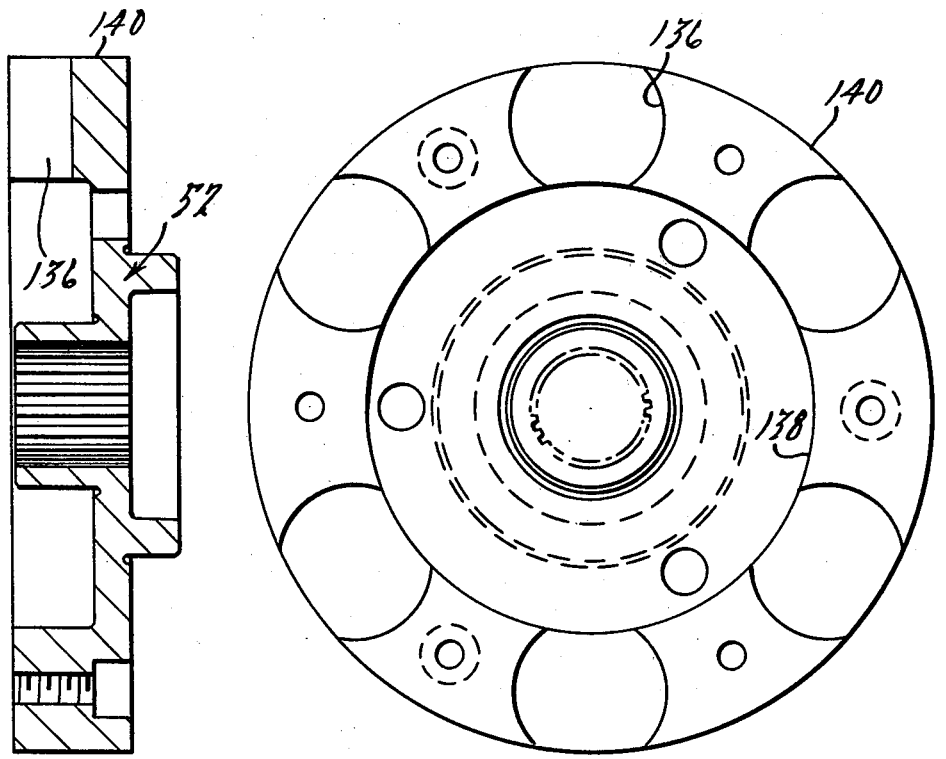
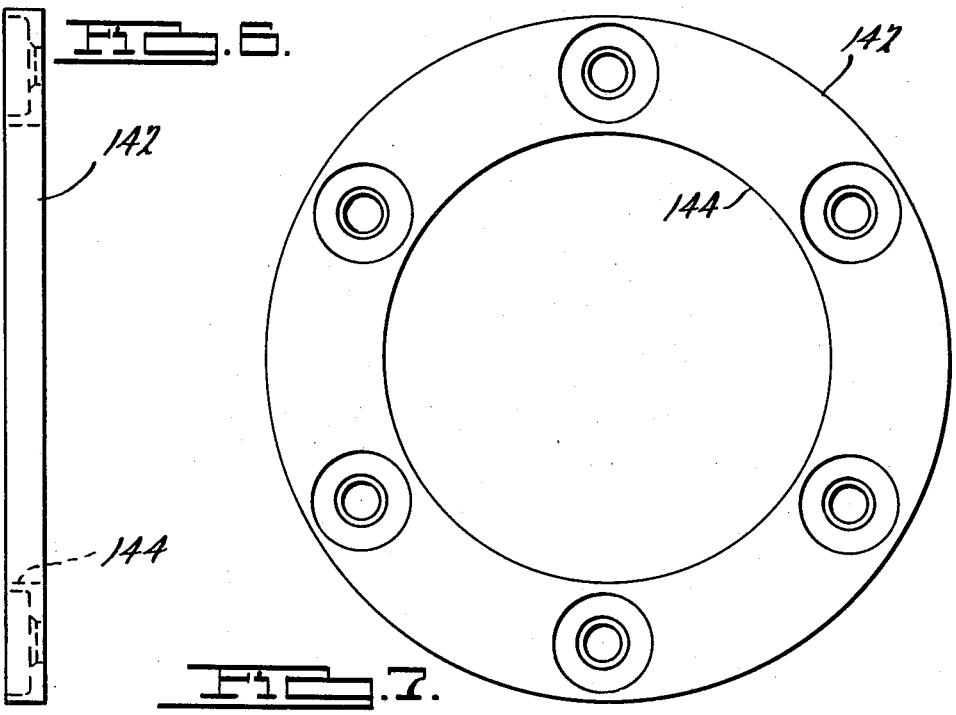

MULTIPLE RATIO TRANSMISSION HAVING A TORQUE SPLITTER INPUT GEAR WITH A POCKETED CARRIER

GENERAL DESCRIPTION OF THE INVENTION

My invention comprises inprovements in a transmission system of the kind shown in U.S. Pat. No. 4,014,223 and in co-pending patent application Ser. No. 82,399, filed by A. S. Leonard and R. C. Bolz on Oct. 5, 1979 now U.S. Pat. No. 4,347,765, patented Sept. 7, 1982, entitled "Multiple Ratio Overdrive Transmission". Each of these earlier disclosures describes a multiple ratio gear system having a pair of gear units adapted to establish multiple ratios and a torque splitter gear unit adapted to distribute torque mechanically to a first input shaft of the multiple ratio gearing and to distribute torque to the multiple ratio gear unit through a second torque delivery path that comprises in part a hydrokinetic unit such as a torque converter. During operation of the gear system of these earlier disclosures torque is distributed partially mechanically and partially hydrokinetically from an input member to an output member thereby reducing the hydrokinetic losses commonly associated with hydrokinetic torque transmission mechanisms. Clutch means is provided for establishing a direct mechanical drive through the gearing during high speed ratio operation so that no hydrokinetic losses are associated with the driveline during cruising or steady-state road load operation of the vehicle with which the driveline is used.

The improvement of my invention comprises a torque splitter unit located entirely within the hydrokinetic unit housing in a pocketed carrier that forms a part of the torque splitter unit. Planetary pinions are mounted within the pockets in the carrier and bearing contact is established between the periphery of the pinions and the internal diameter of the pockets. No pinion shafts are required to journal the pinions since the pinions are fully supported on their addendum circles. Sufficient lubrication is provided for journalling the pinions in the pockets of the carrier by reason of the fact that the splitter unit itself is located within the converter housing and is immersed fully in hydrokinetic torque converter fluid. A continuous oil film between the walls of the carrier pockets and the addendum circles of the pinions thus is assured. Further, needle bearings or bushings for the planet gears are eliminated and the need for using thrust washers between the planet gears and the carrier itself also is eliminated. Neither is it required to machine openings in the pinions that normally would be required if they were to be mounted on pinion shafts. This simplifies the manufacture of the transmission and reduces manufacturing costs. The elimination of the openings in the planets also makes it possible to use planet pinion diameters that are smaller than normally would be possible and this in turn provides more ratio flexibility in the gear unit.

The presence of friction in the gearing of the torque splitter unit results from the greater bearing surface on the addendum circle of the pinions. This causes a smaller percentage of the total torque delivered through the torque converter than would be the case if friction in the torque splitter unit were to be substantially eliminated. The presence of friction in the splitter unit also decreases the converter slip thereby improving further the fuel economy of the engine.

It is feasible in a design of this type to form the planet pinions of powdered metal and to make the planet pinion teeth of the spur type rather than the helical type. This eliminates the thrust forces normally associated with helical gearing.

The torque converter characteristics are altered when friction is introduced into the torque splitter unit as above described, and this in turn causes the converter to assume a coupling condition earlier in the acceleration mode than would be the case if the splitter unit were formed in the conventional manner with pinion shafts and needle bearings.

A second embodiment of the invention disclosed here makes provision for piloting the torque splitter sun gear on the carrier as well as the torque splitter ring gear, the sun gear being piloted on the carrier at the inside diameter of the carrier and the outside diameter providing a pilot surface for the ring gear. This eliminates the need for providing bushings for the ring gear and at the same time additional friction is achieved to reduce further the percentage of the engine torque delivered hydrokinetically through the gear system.

It is known in the art to provide differential gear mechanisms wherein the differential pinions are supported on the addendum circles within the differential carrier housing. This is shown, for example, in Roberts U.S. Pat. No. 2,978,929 and Wildhaber U.S. Pat. No. 2,791,919. Other patent references of interest in this regard are Nos. 2,178,613; 3,292,456; 3,406,593 and Myers 3,706,239. The friction imparted to the differential by the pinions in these disclosures adds a torque bias to the differential mechanism, thereby, in effect, providing a limited slip driveline for the traction wheels of an automotive vehicle. A general disclosure of planetary gearing other than automotive vehicle differential gearing is seen in Dorsey U.S. Pat. No. 1,435,821 and Cook et al. U.S. Pat. No. 1,417,797.

BRIEF DESCRIPTION OF THE FIGURES OF THE DRAWINGS

FIG. 2 is a schematic representation of the torque splitter gear unit and torque converter of FIG. 1 in combination with multiple ratio gearing having two torque input shafts.

FIG. 3 is a chart showing the clutch engagement-and-release pattern during the various operating modes of the transmission structure shown in FIG. 2.

FIG. 4 is a cross-sectional view of the carrier for the splitter unit showing the pockets for the planet pinions as well as pockets for the sun gear.

FIG. 5 is an end view of the carrier of FIG. 4.

FIG. 6 shows the cap that is bolted to the carrier portion shown in FIG. 4.

FIG. 7 is an end view of the cap of FIG. 6.

PARTICULAR DESCRIPTION OF THE INVENTION

Figure 1:
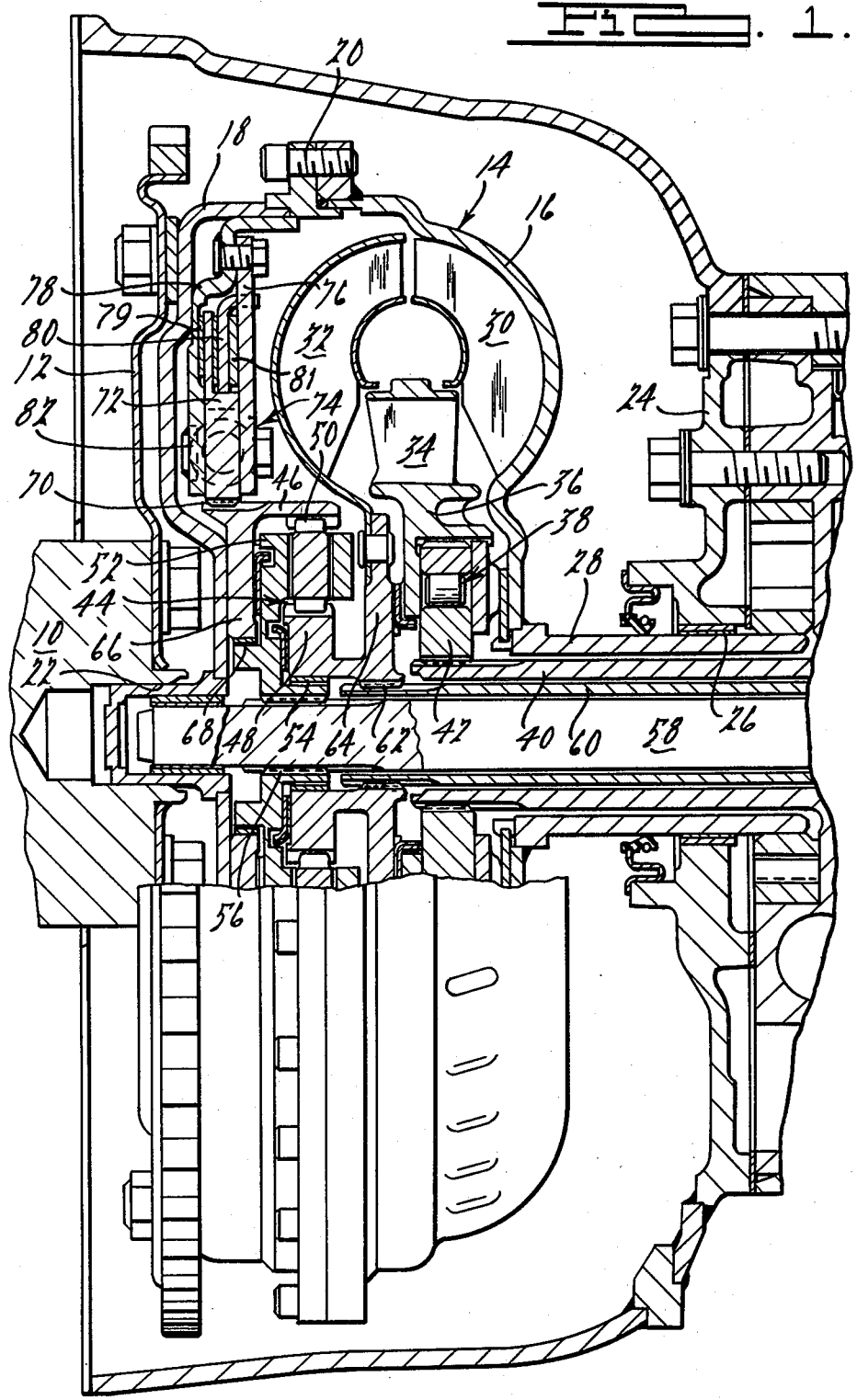
FIG. 1 shows a torque converter assembly with a torque splitter unit embodying the principles of my invention.

The structure shown in FIG. 1 has many components that are common to the disclosure of application Ser. No. 82,399, previously mentioned. Reference may be had to that disclosure for the purpose of simplifying this disclosure and for a better understanding of the operation of the converter.

In FIG. 1 reference numeral 10 indicates one end of an engine crankshaft which is bolted to driveplate 12 for a hydrokinetic torque converter unit 14. The torque converter 14 includes a converter housing having a first impeller housing portion 16 and a second impeller housing portion 18. The two are joined together, such as by bolts 20, at their outer margins to form a closed torque converter housing assembly. The hub of housing portion 18 is piloted, as shown at 22, in a pilot opening formed in the crankshaft 10.

A forward wall 24 of the transmission housing for the gearing is provided with a bearing opening 26 which forms a journal support for torque converter sleeve shaft 28.

The torque converter 14 includes a bladed impeller 30, a bladed turbine 32 and a bladed stator 34. A stator hub 36 receives overrunning brake 38 which is secured in and supported by a stationary stator sleeve shaft 40, the inner race 42 of the brake 38 being splined to the shaft 40.

A simple planetary torque splitter gear unit 44 is located within the torque converter housing and is immersed in the hydrokinetic oil that fills the converter housing.

The torque splitter unit 44 comprises a ring gear 46, a sun gear 48 and planet pinions 50. A carrier, which will be described subsequently in more detail, is indicated in FIG. 1 by reference character 52. As will be explained subsequently, carrier 52 journals the pinions 50 on the outside diameter of the pinions. The pinions engage ring gear 46 and sun gear 48 supported by bushing 54 on a shoulder formed by the carrier. The carrier is splined at 56 to a central torque delivery shaft 58 which is connected, as will be explained subsequently with reference to FIG. 2, to a torque input element of the multiple ratio gearing. A sleeve shaft 60 surrounds the shaft 58 and forms a second torque input element for the multiple ratio gearing as will be explained also with reference to FIG. 2. Sleeve shaft 60 is splined at 62 to the hub 64 of the turbine 32. Sun gear 48 and turbine hub 64 are connected together or formed integrally as a single assembly.

Ring gear 46 is supported by ring gear plate 66 which is piloted in the embodiment shown in FIG. 1 on a shoulder formed on the carrier as shown at 68. The outside diameter of the ring gear 46 is splined as shown at 70 to a drive disc 72 for a spring damper 74. This damper includes side plates 76 and 78 that are fixed by welding or by other fasening methods to the inside wall of the housing portion 18. Friction material 79 secured to the sides of disc 72 provides a frictional resistance to relative movement of the driveplate 72 with respect to the plates 78 and 76. This relative movement is resisted by tangentially disposed damper springs 82 received in spring openings formed in the driveplate 72 and in the adjacent plates 76 and 78. A disc 80 with a drive tang rotates with plate 76 and is urged against the friction material by Belleville washer 81.

FIG. 2 shows in schematic form a gear system that is capable of being used with the torque converter and split torque planetary gear unit of FIG. 1. This gear unit includes two simple planetary gear units 84 and 86 referred to respectively in FIG. 2 and in the accompanying FIG. 3 by the symbol $R_2$ and $R_3$.

Gear unit 84 includes in addition to the ring gear 85, a sun gear 88 and planet pinions which are journalled on carrier 92. Carrier 92 is connected to ring gear 94 for the simple planetary gear unit 86. Gear unit 86 includes also sun 96 and plant pinions 98 which are carried on carrier 100. Carrier 100 is connected to ring gear 85.

A brake 102 is adapted to selectively anchor the sun gear 96. Another brake, which may be a disc brake as shown at 104, is adapted to anchor the carrier 92 and the ring gear 94.

Overrunning brake 106 is adapted to connect the sun gear 48 to the sun gear 88 during operation in the low- and-reverse drive loads. Overrunning coupling 106 can be bypassed by a selectively engageable clutch 108 during manual-low operation and during reverse clutch. The clutch 110 is applied to connect the secondary input shaft 58 to the carrier 92 during operation in the intermediate drive ratio as well as during direct drive operation.

Reverse drive is obtained by engaging simultaneously clutches $CL_1$ and $CL_3$. All of the elements thus rotate in unison and the hydrokinetic unit is bypassed.

FIG. 4 shows a carrier 52 in cross sectional form. The carrier 52 includes pocket 136 that has a diameter substantially equal to the addendum circle diameter of the pinions so that the pinions ride on their addendum circles and are supported in the pockets 136. The inside diameter 138 of the carrier 52, as seen in FIG. 5, is sufficiently large so that the pinions extend through the inner portion of the carrier and engage sun gear 48. Similarly, the outer diameter of the surface 140 of the carrier 52 is small enough so that the pinions extend radially outwardly permitting the pinion teeth to engage ring gear 42 of the simple planetary torque splitter gear unit 50.

FIG. 6 and FIG. 7 show the end cap that is bolted to the side of the carrier structure 52 so that the pinions are retained in the pockets 136. The pinions can be formed sufficiently small to provide a minimum space requirement without decreasing the strength of the pinions since no central opening is required for accommodating the pinion shafts as in convention constructions.

In a second embodiment of my invention the outer periphery 142, shown in FIGS. 6 and 7, is of a sufficient diameter to permit the piloting of the ring gear 46 without the necessity for providing any other ring gear bearing. Also the sun gear 148 can be piloted on the inside diameter 144 shown in FIG. 7. In this embodiment no special bearings for the sun gear are required since the addendum circle of the sun gear provides a bearing support for the sun gear regardless of whether the pinions only are supported by the carrier or whether the sun gear and ring gear as well as the pinions are supported in the manner previously described.

The gear unit is fully immersed in oil and no appreciable wear of the gears or pinions will take place. There may, however, be more friction in a planet gear set of this kind than in a gear set having conventional pinion shafts and needle bearings. This friction is desirable in this instance since it permits a greater proportion of torque to be distributed mechanically through the drive system thus enhancing the overall engine fuel economy of the engine.

The friction further causes the torque converter, when operating in the third gear ratio, to achieve a coupling condition at a lower engine speed. The torque splitting gears preferably can be formed on the spur tooth geometry, thus eliminating the side thrust forces. The pinions can be made in part of powdered metal as well as the carrier itself thereby making it possible to maintain good dimensional control during manufacture. The number of pinions may be varied as desired depending upon the torque capacity that is required. The diameters of the planet pinions can be made smaller if the number of pinions is increased and the overall size of the splitter unit can then be reduced in comparison to a splitter unit with fewer planets.

Having thus described preferred embodiments of my invention, what I claim and desire to secure by U.S. Letters Patent is:

1. A hydrokinetic power transmission mechanism comprising multiple ratio gearing and a hydrokinetic torque converter adapted to establish a driving connection between a driving shaft and a driven shaft;

said converter including an impeller connected to said driving shaft, a pair of torque input shafts for said gearing, a turbine connected to one of said torque input shafts;

a torque splitter planetary gear unit located within said converter and including a ring gear and a sun gear and a set of planet pinions, said pinions being rotatably mounted within a torque splitter carrier, said carrier being connected drivably to a second of said torque input shafts, said ring gear having a cylindrical inner periphery with internal teeth thereon;

said converter operating in hydrokinetic fluid that immerses said splitter gear unit;

said carrier having circular pockets defining circular frictional surfaces within which said pinions are positioned so that the addendum circles frictionally engage said frictional surfaces;

said pinions engaging said ring gear and said sun gear, the ring gear being coupled to said impeller and the sun gear being coupled to said turbine; and the addendum circles for said pinions being on friction torque surfaces whereby a friction torque flow path through said splitter gear unit bypasses the hydrokinetic torque flow path through said hydrokinetic unit.

2. The combination as set forth in claim 1 wherein said simple planetary torque spitter gear unit comprises a planet pinion having spur type tooth involute forms, the addendum circles of said pinion teeth being supported on the inner circular surfaces of the pockets of said carrier thereby causing increased friction as torque is transmitted through the gear unit whereby the percentage of torque delivered mechanically through the transmission is increased relative to the percentage of torque delivered hydrokinetically.

3. The combination as set forth in claim 1 wherein said carrier includes an outer peripheral surface adapted to journal said ring gear on the inside diameter of said internal gear teeth and wherein said carrier also is formed with an internal bearing surface adapted to support the sun gear of said torque splitter gear unit, the addenum circles for said pinions and the internal bearing surface of said ring gear being on friction torque surfaces whereby a friction torque flow path through said splitter gear unit bypasses the hydrokinetic torque flow path through said hydrokinetic unit.

4. The combination as set forth in claim 2 wherein said carrier includes an outer peripheral surface adapted to journal said ring gear on the inside diameter of said internal gear teeth and wherein said carrier also is formed with an internal bearing surface adapted to support the sun gear of said torque splitter gear unit, the addendum cirles for said pinions and the internal bearing surface of said ring gear being on friction torque surfaces whereby a friction torque flow path through said splitter gear unit bypasses the hydrokinetic torque flow path through said hydrokinetic unit.

* * * * *